United States Patent [19]
Ragno et al.

[11] Patent Number: 5,968,304
[45] Date of Patent: *Oct. 19, 1999

[54] PROCESS FOR FORMING FLUID FLOW CONDUIT SYSTEMS AND PRODUCTS THEREOF

[75] Inventors: Michael A. Ragno, Clover, S.C.; Micheal H. Topping, Charlotte, N.C.

[73] Assignee: Ashland, Inc., Dublin, Ohio

[ * ] Notice: This patent is subject to a terminal disclaimer.

[21] Appl. No.: 09/025,881

[22] Filed: Feb. 19, 1998

Related U.S. Application Data

[63] Continuation-in-part of application No. 08/856,327, May 14, 1997.

[51] Int. Cl.$^6$ .................................................. B32B 31/14
[52] U.S. Cl. .................... 156/272.4; 156/275.1; 156/275.7; 156/294; 219/633; 219/634; 285/915
[58] Field of Search .............................. 156/272.4, 274.4, 156/274.8, 275.3, 275.7, 275.1, 294; 219/633, 634; 285/239, 423, 915

[56] References Cited

U.S. PATENT DOCUMENTS

| | | | |
|---|---|---|---|
| 3,620,875 | 11/1971 | Guglielmo et al. | 156/272.4 |
| 4,146,586 | 3/1979 | McConnell et al. | 525/174 |
| 4,726,869 | 2/1988 | Matsui et al. | 156/294 |
| 5,810,958 | 9/1998 | Ragno et al. | 156/272.4 |
| 5,833,542 | 11/1998 | Harrold et al. | 156/272.4 |

*Primary Examiner*—Michael W. Ball
*Assistant Examiner*—Michael A Tolin
*Attorney, Agent, or Firm*—Louis E. Marn

[57] ABSTRACT

There is disclosed a process for bonding a rigid thermoplastic vessel to a flexible thermoset elastomeric conduit using electromagnetic bonding techniques wherein the flexible thermoset elastomeric conduit is configured to provide close fitting relationship under compressive pressure forces to a cooperating element of the rigid thermoplastic vessel between which is positioned an electromagnetic bonding adhesive prior to applying an electromagnetic force.

4 Claims, 1 Drawing Sheet

PROCESS FOR FORMING FLUID FLOW CONDUIT SYSTEMS AND PRODUCTS THEREOF

RELATED APPLICATIONS

This is a continuation-in-part application of U.S. application Ser. No. 08/856,327 filed May 14, 1997.

BACKGROUND OF THE INVENTION

1. Field of the Invention

This invention relates to the bonding of thermoplastic parts, and more particularly, to the electromagnetic bonding of a rigid thermoplastic article to a flexible thermoplastic article in forming fluid flow conduit systems.

2. Description of the Prior Art

In the automotive industry, the use of rigid thermoplastic materials in forming air intake conduits parts, such as intake resonators, air cleaner boxes, throttle body bonnets, helm holtz chambers and the like, has substantially replaced the use of metallic materials of construction. Such parts are used with conduits for internal combustion engines and are formed of thermosetting elastomers, such as synthetic rubbers and the like, using mechanical fasteners, such as clamps. While initially effective in sealing the components, after short periods of time, leak paths develop permitting the induction of foreign particles, such as dust, which deleteriously effect engine oil thereby requiring shortened interval for oil changes.

In U.S. Pat. No. 3,620,875, there is disclosed electromagnetic binding between rigid thermoplastic sections using an electromagnetic adhesive composition comprised of particulate electromagnetic energy absorbing material. Such techniques are ineffective in bonding of a thermosetting elastomer, such as rubber, due to its mobility to remelt and bond to a thermoplastic material.

In copending application Ser. No. 08/856,327 filed May 14, 1997, there is disclosed an air intake conduit system comprised of a rigid thermoplastic vessel bonded to a flexible thermoplastic conduit wherein one end of the flexible conduit is clamped onto a metal component of the engine. It has been found that through repeated cycles of heating, that the flexible thermoplastic conduit in contact with the engine exhibits creep properties, i.e. relaxing of physical characteristics requiring periodic resetting of the clamping force.

OBJECTS OF THE INVENTION

An object of the present invention is to eliminate the use of mechanical fasteners in air intake conduit systems for internal combustion engines.

Another object of the present invention is to eliminate the use of mechanical fasteners in internal combustion engine air intake conduit systems to achieve hermetically sealed air intake conduit system.

Still another object of the present invention is to eliminate the use of mechanical fasteners in internal combustion engine air intake conduit systems to extend time periods between engine oil changes.

A further object of the present invention is to provide a permanent intake connection.

A still further object of the present invention is to provide a recyclable conduit system.

Yet another object of the present invention is to eliminate the use of mechanical fasteners in internal combustion engine air intake systems by providing electromagnetic bonding system for plastic parts permitting increased productivity and diversely-shaped conduit connection.

SUMMARY OF THE INVENTION

These and other objects of the present invention are achieved in a process for bonding a rigid thermoplastic vessel to a flexible thermoset elastomeric conduit using electromagnetic bonding techniques wherein the flexible thermoset elastomeric conduit is configured to provide close fitting relationship under compression forces to a cooperating element of the rigid thermoplastic vessel between which is positioned an electromagnetic bonding adhesive prior to applying an electromagnetic force wherein the flexible conduit clamped to the engine component obviates the creep problem associated with thermoplastic materials or natural rubber.

BRIEF DESCRIPTION OF THE DRAWINGS

Further objects and advantages of present invention will become apparent on consideration of the detailed disclosure thereof, especially when taken with the accompanying drawings wherein.

DETAILED DESCRIPTION OF THE DRAWINGS

Figure 1:
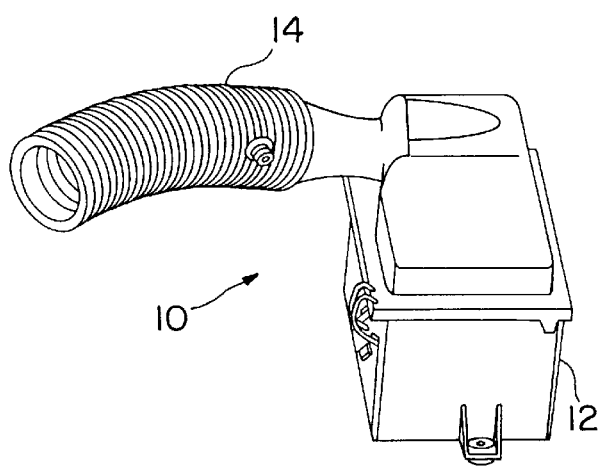
FIG. 1 is an isometric view of an intake reservoir coupled to a flexible conduit formed in accordance with the present invention.

Referring now to the drawings, and particularly FIG. 1, there is illustrated an air conduit system for an internal combustion engine, generally indicated as 10, formed in accordance with the present invention including an air cleaner assembly 12 having an air filter (not shown) connected by a flexible corrugated thermoset elastomeric conduit 14.

Figure 2:
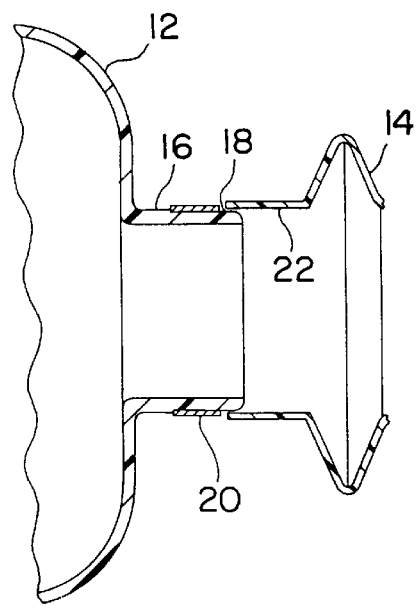
FIG. 2 is a partial cross-sectional view of the intake reservoir and flexible conduit prior to positioning of the elements for electromagnetic bonding.

The air cleaner assembly 12 in accordance with the present invention is formed of a rigid thermoplastic material including a cylindrically-shaped coupling member 16, referring to FIG. 2. The coupling member 16 is formed with a cylindrically-shaped shoulder portion 18 of a smaller diameter than the diameter of the coupling member 16 extending outwardly from the air cleaner assembly 12. About the shoulder portion 18, there is positioned a cylindrically-shaped gasket member 20 formed of an injection or extruded mold thermoplastic material, such as polypropylene containing an electromagnetic energy absorbing material, such as disclosed in aforementioned U.S. Pat. No. 3,620,875 to Guglielmo et al. The amount of the electromagnetic energy absorbing material is at least 60% to about 76% by weight of the gasket member 18 and is of a material selected from the group consisting of iron, cobalt, nickel, alloys containing nickel, alloys containing cobalt and alloys containing iron.

Figure 3:
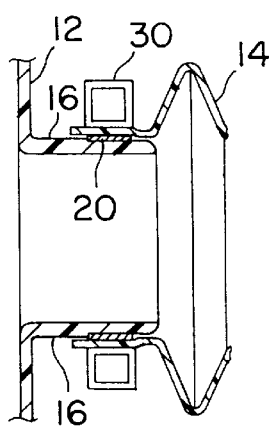
FIG. 3 is a partial cross-section view of the elements in position prior to electromagnetic bonding.

The corrugated conduit 14 is formed of a flexible thermoset elastomeric material and includes a cylindrically-shaped end portion 22 of an internal diameter greater than the outer diameter of the shoulder portion 18 of the air cleaner assembly 12 and less than the diameter of the coupling member 16. The end portion 22 of the corrugated conduit 14 is positioned over the shoulder portion 18 and caused to ride over the gasket member 20, referring now to FIG. 3, to be maintained under compressive forces over the gasket member 20, i.e. compressive interference fitting relationship therebetween. The thermoset elastomeric materials include EPDM rubber and ethylene-propylene based thermosetting plastic materials.

Figure 4:
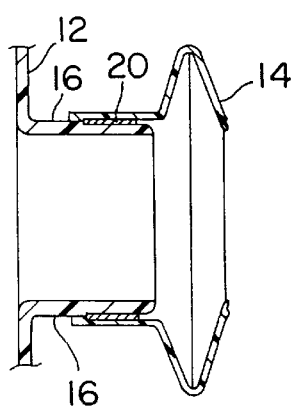
FIG. 4 is a partial cross-sectional view of the electromagnetic bonded elements.

An induction coil 30 is positioned about the end portion 22 of the corrugated conduit 14 in the interference fitting relationship with the gasket member 20 disposed on the shoulder portion 20 whereupon an electromagnetic field is generated of from about 2 to 30 megacycles, preferably 2 to 10 megacycles by a power source of from about 1 to about 30 kilowatts for a time generally of from about 1.5 to about 4.0 seconds to effect bonding and hermetic sealing between the coupling member 16 of the air cleaner 12 and the end portion 22 of the flexible conduit 14 without any concomitant degradation of the materials of the components of the air cleaner system 10, referring now to FIG. 4.

The adhesive compositions permit the joining of the thermoplastic items without costly surface pretreatment. The bond created between the vessel and conduit exhibits strengths greater than the material itself and the electromagnetically-induced bonding reaction occurs rapidly permitting automated fabrication techniques. The heating effect is continued to the joint for a time period of from about 1.5 to 4.0 seconds with a substantial saving of power and with avoidance of distortion to the articles being secured together both exceedingly high weld strengths are achieved. Since the weld is effected by chemical bonding between the thermoplastic material, the thermoset elastomeric material and adhesive composition, the thermoplastic material, the thermoset elastomeric material and adhesive composition must include compatible functional groups, e.g. ethylene, propylene or ester groups.

While the invention has been described with reference to a cylindrically-shaped coupling member and end portion, it is understood to one skilled in the art that other shapes, such as an elliptically-shaped coupling member and end portion of the conduit may be used in accordance with the present invention.

While the present invention has been described in connection with an exemplary embodiment thereof, it will be understood that many modifications will be apparent to those of ordinary skill in the art; and that this application is intended to cover any adaptations or variations thereof. Therefore, it is manifestly intended that this invention be only limited by the claims and the equivalents thereof.

What is claimed:

1. A method for forming fluid conduit systems between a rigid thermoplastic vessel including a coupling element and a flexible thermoset elastomeric conduit including an end portion, which comprises:

positioning a bonding layer of an electromagnetically-activated adhesive composition about a shoulder portion of said coupling element of said rigid thermoplastic vessel, said shoulder portion being of a smaller dimension than said coupling element, said bonding layer of said thermoplastic material having uniformly distributed electromagnetic energy absorbing particles of at least about 60 percent by weight of said electromagnetically-activated adhesive composition;

positioning said end portion of said flexible thermoset elastomeric conduit over said coupling member of said thermoplastic vessel under compressive interference relationship with said bonding layer of said electromagnetically-activated adhesive composition;

subjecting said thermoplastic vessel and said thermoset elastomeric conduit and interposed bonding layer to an electromagnetic field of sufficient power and frequency to inductively heat said electromagnetically energy absorbing particles whereby said thermoplastic material of said bonding layer and areas of said thermoplastic vessel and said thermoset elastomeric conduit to be sealed are rapidly heating to above their melting points; and terminating said electromagnetic field after melting and prior to material degradation to effect bonding of said thermoset elastomeric conduit to said thermoplastic rigid vessel.

2. The method as defined in claim 1 wherein said electromagnetic energy absorbing particles are of a size of from about 20 mesh to about 200 mesh.

3. The method as defined in claim 2 wherein said electromagnetic field has a field intensity of about 1 to about 30 kilowatts and a frequency of about 2 to about 30 megacycles.

4. The method as defined in claim 1 wherein said coupling element of said rigid thermoplastic vessel and said end portion of said flexible elastomeric conduit are cylindrically-shaped, said shoulder portion of said coupling element having an outer diameter smaller than an outer diameter of said coupling element, said end portion of flexible thermoset elastomeric conduit having an inner diameter smaller than said outer diameter of said coupling member.

* * * * *